US006804647B1

(12) United States Patent
Heck et al.

(10) Patent No.: US 6,804,647 B1
(45) Date of Patent: Oct. 12, 2004

(54) METHOD AND SYSTEM FOR ON-LINE UNSUPERVISED ADAPTATION IN SPEAKER VERIFICATION

(75) Inventors: Larry Paul Heck, Los Altos, CA (US); N. Nikki Mirghafori, Fremont, CA (US)

(73) Assignee: Nuance Communications, Menlo Park, CA (US)

( * ) Notice: Subject to any disclaimer, the term of this patent is extended or adjusted under 35 U.S.C. 154(b) by 299 days.

(21) Appl. No.: 09/808,074

(22) Filed: Mar. 13, 2001

(51) Int. Cl.[7] .............................................. G10L 17/00
(52) U.S. Cl. ..................... 704/246; 704/270.1; 704/273
(58) Field of Search .............................. 704/246, 270.1, 704/273

(56) References Cited

U.S. PATENT DOCUMENTS

| | | | | |
|---|---|---|---|---|
| 5,528,731 A | * | 6/1996 | Sachs et al. ................ | 704/246 |
| 5,774,841 A | * | 6/1998 | Salazar et al. .............. | 704/225 |
| 5,950,157 A | | 9/1999 | Heck et al. | |
| 5,960,397 A | * | 9/1999 | Rahim ........................ | 704/244 |
| 6,032,115 A | * | 2/2000 | Kanazawa et al. .......... | 704/234 |
| 6,233,556 B1 | * | 5/2001 | Teunen et al. .............. | 704/250 |
| 6,266,633 B1 | * | 7/2001 | Higgins et al. ............. | 704/224 |
| 6,327,565 B1 | * | 12/2001 | Kuhn et al. ................. | 704/255 |
| 2002/0077828 A1 | * | 6/2002 | Robbins ................. | 704/270.1 |

FOREIGN PATENT DOCUMENTS

EP          0424071 A2     4/1991

OTHER PUBLICATIONS

L.P. Heck and N. Mirghafori, "On–line Unsupervised Adaptation in Speaker Verification," Proceedings of the International Conference on Spoken Language Processing, pp. 1–4, Beijing, China, Oct. 18, 2000.

Douglas A. Reynolds, Automatic Speaker Recognition Using Gaussian Mixture Speaker Models, vol. 8, No. 2, 1995, The Lincoln Laboratory Journal, pp. 173–192.

Remco Teunen, Ben Shahshahani, Larry Heck, "A Model–Based Transformational Approach To Robust Speaker Recognition," Nuance Communication, 1380 Willow Rd, Menlo Park, CA 94025, USA.

C. Fredouille, J. Mariethoz, C. Joboulet, J. Hennebert, J.–F. Bonastre, C. Mokbel, F. Bimbot, "Behavior Of A Bayesian Adaptation Method For Incremental Enrollment In Speaker Verification," ICASSP2000 Istanbal, Turkey.

Owen Kimbal, Michael Schmidt, Herbert Gish, Jason Waterman, "Speaker Verification With Limited Enrollment Data," BBN Systems & Tech., 70 Fawcett St., Cambridge, MA 02138 USA, Eurospeech 97, Rhodes, Greece.

Aaron E. Rosenberg, Chin–Hui Lee, Frank K. Soong, "Sub–Word Unit Talker Verification Using Hidden Marker Models" IEEE ICASSP 90.

William Mistretta, Kevin Farrell, "Model Adaptation Methods For Speaker Verification," T–Netix/SpeakEZ Inc., 67 Inverness Drive East Englewood, CO 80112, ICASSP98 Seattle, WA.

Tatsuo Matsuoka, Chin–Hui Lee, "A Study Of On–Line Bayesian Adaptation For HMM–Based Speech Recognition," Speech Research Dept., AT&T Bell Lab., Murray Hill, N.J. 07974, USA, Eurospeech 93 vol. 2. Verlin, Germany.

* cited by examiner

*Primary Examiner*—Vijay Chawan
*Assistant Examiner*—Michael N. Opsasnick
(74) *Attorney, Agent, or Firm*—Blakely, Sokoloff, Taylor & Zafman LLP (57) ABSTRACT

The present invention introduces a system and method for unsupervised, on-line, adaptation in speaker verification. In one embodiment, a method for adapting a speaker model to improve the verification of a speaker's voice, comprises detecting a channel of a verification utterance; learning vocal characteristics of the speaker on the detected channel; and transforming the learned vocal characteristics of the speaker from the detected channel to the speaker model of a second channel.

22 Claims, 4 Drawing Sheets

METHOD AND SYSTEM FOR ON-LINE UNSUPERVISED ADAPTATION IN SPEAKER VERIFICATION

FIELD OF THE INVENTION

The present invention relates to the field of speech recognition. In particular the present invention relates to a system and method for on-line unsupervised adaptation in speaker verification.

BACKGROUND OF THE INVENTION

Natural language speaker verification systems are currently in use for responding to various forms of commerce via a telephone network. One example of such a system is utilized in conjunction with a stock brokerage. According to this system, once a caller's voice has been authenticated, the caller may obtain a quotation for the price of a particular stock issue, purchase or sell a particular number of shares at market price or a predetermined target price among other types of transactions. Natural language systems can also be used to respond to such things as requests for telephone directory assistance.

One of the most significant sources of performance degradation in a speaker verification system is the acoustic mismatch between the enrollment and subsequent verification sessions. Acoustic mismatches may occur as a result of differences in transducers, acoustic environment, and communication channel characteristics (e.g., varying channels associated with combinations of different subnetworks utilized in a telephone call). Of the factors contributing to acoustic mismatch in telephony applications, it has been shown that the mismatch in transducers of telephone handsets is the most dominant source of performance degradation.

To address the acoustic mismatch problem, a variety of approaches for robust speaker recognition have been developed in the past several years. These approaches include robust feature, model, and score-based normalization techniques. These approaches use off-line development data to compensate for the effects of acoustic mismatch that will be present when the system is used on-line.

Another approach has been developed that uses on-line unsupervised adaptation to "learn" the unseen channel characteristics automatically while the system is being used in the field. Unsupervised systems do not require human intervention during the verification process. Compared to off-line adaptation approaches, on-line approaches provides significantly more data for parameter estimation than typically available to the speaker verification system, facilitating more sophisticated modeling approaches and automated parameter tuning. Furthermore, rather than predicting the effects of acoustic mismatch with development data, the effects can be observed directly from this additional data.

Prior approaches to on-line unsupervised adaptation suffered from numerous limitations. For example, adaptation of the speaker model suffered negative effects from impostor attacks, it significantly increased the size of the speaker model, and it degraded the performance on the enrollment handset-type when adapting on new handset types.

SUMMARY OF THE INVENTION

The present invention introduces a system and method for unsupervised, on-line, adaptation in speaker verification. In one embodiment, a method for adapting a speaker model to improve the verification of a speaker's voice, comprises detecting a channel of a verification utterance; learning vocal characteristics of the speaker on the detected channel; and transforming the learned vocal characteristics of the speaker from the detected channel to the speaker model of a second channel.

Other features of the present invention will be apparent from the accompanying drawings and from the detailed description, which follows.

BRIEF DESCRIPTION OF THE DRAWINGS

The objects, features and advantages of the present invention will be apparent to one skilled in the art in view of the following detailed description in which.

DETAILED DESCRIPTION

The present invention introduces a system and method for unsupervised, on-line, adaptation in speaker verification. In one embodiment, a method for adapting a speaker model to improve the verification of a speaker's voice, comprises detecting a channel of a verification utterance; learning vocal characteristics of the speaker on the detected channel; and transforming the learned vocal characteristics of the speaker from the detected channel to the speaker model of a second channel.

The present invention also relates to systems for performing the operations herein. The techniques described herein may be implemented using a general-purpose computer selectively activated or configured by a computer program stored in the computer or elsewhere. Such a computer program may be stored in a computer readable storage medium, such as, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently constrained to any particular type of computer or other system. Various general-purpose systems may be used with programs in accordance with the teachings herein, or it may prove convenient to construct more specialized system to perform the required method steps. The required structure for a variety of these systems will be apparent from the description below. In addition, any of a variety of programming languages, including C++ and Java, may be used to implement the teachings of the techniques described herein.

Note that in this description, references to "one embodiment" or "an embodiment" mean that the feature being referred to is included in at least one embodiment of the present invention. Further, separate references to "one embodiment" in this description do not necessarily refer to the same embodiment, however, neither are such embodiments mutually exclusive.

Figure 1:
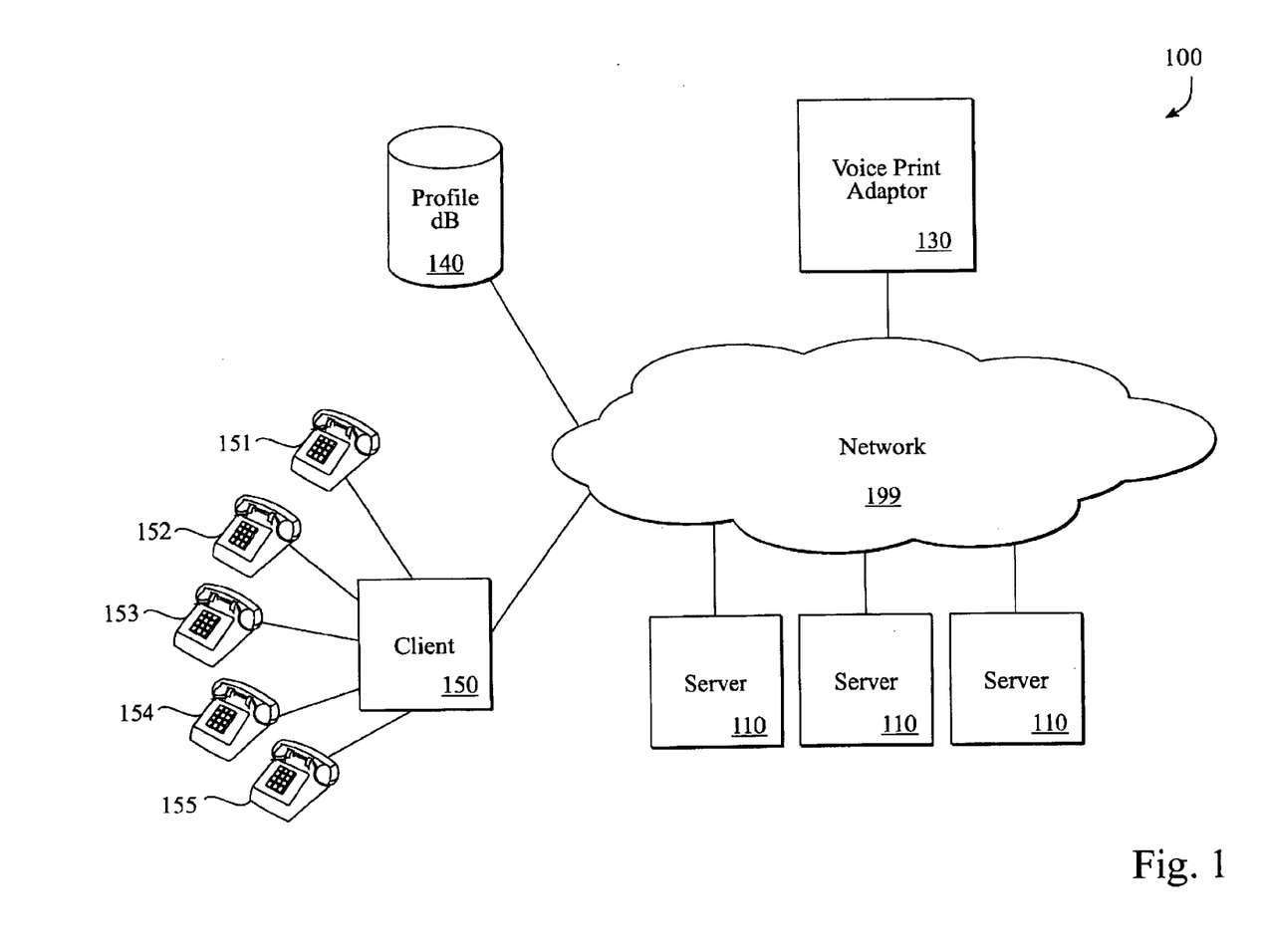
FIG. 1 is a high-level block diagram of an exemplary speaker verification system according to one embodiment of the present invention.

Elements of the present invention may be included within a speaker verification system 100 such as that illustrated in FIG. 1. According to the embodiment depicted in FIG. 1, one or more servers 110 communicate to a plurality of clients 150. The clients 150 may transmit and receive data from servers 110 over a variety of communication media including (but not limited to) a local area network and/or a larger network 199 (e.g., the Internet). Alternative communication channels such as wireless communication via satellite broadcast (not shown) are also contemplated within the scope of the present invention.

Clients 150 service callers 151–155. Callers 151–155 may be electrets, carbon button, hands free analog or digital telephones, cellular phones, voice over IP, or other similar device capable of transmitting and receiving voice. Servers 110 may include a database 140 for storing various types of data. This may include, for example, specific caller data (e.g., caller account information and caller preferences) and/or more general data. Database 140 may store speaker models of callers 151–155. In addition, database 140 may store a list of all permitted callers, that is a list of callers that are allowed access to and are enrolled with system 100. The database on servers 110 in one embodiment runs an instance of a Relational Database Management System (RDBMS), such as Microsoft™ SQL-Server, Oracle™ or the like.

System 100 also includes voice print adapters 130 that adapt synthesized voice prints or speaker models to improve speaker verification performance. Generally, voice print adapter 130 automatically updates a speaker model with information from subsequent verification sessions, including user utterances for new handset-types. Although shown as its own block, voice print adapter may be distributed throughout system 100. For example, adapter 130 may be implemented within servers 110 or client 150 according to one embodiment of the present invention.

A COMPUTER ARCHITECTURE

Figure 2:
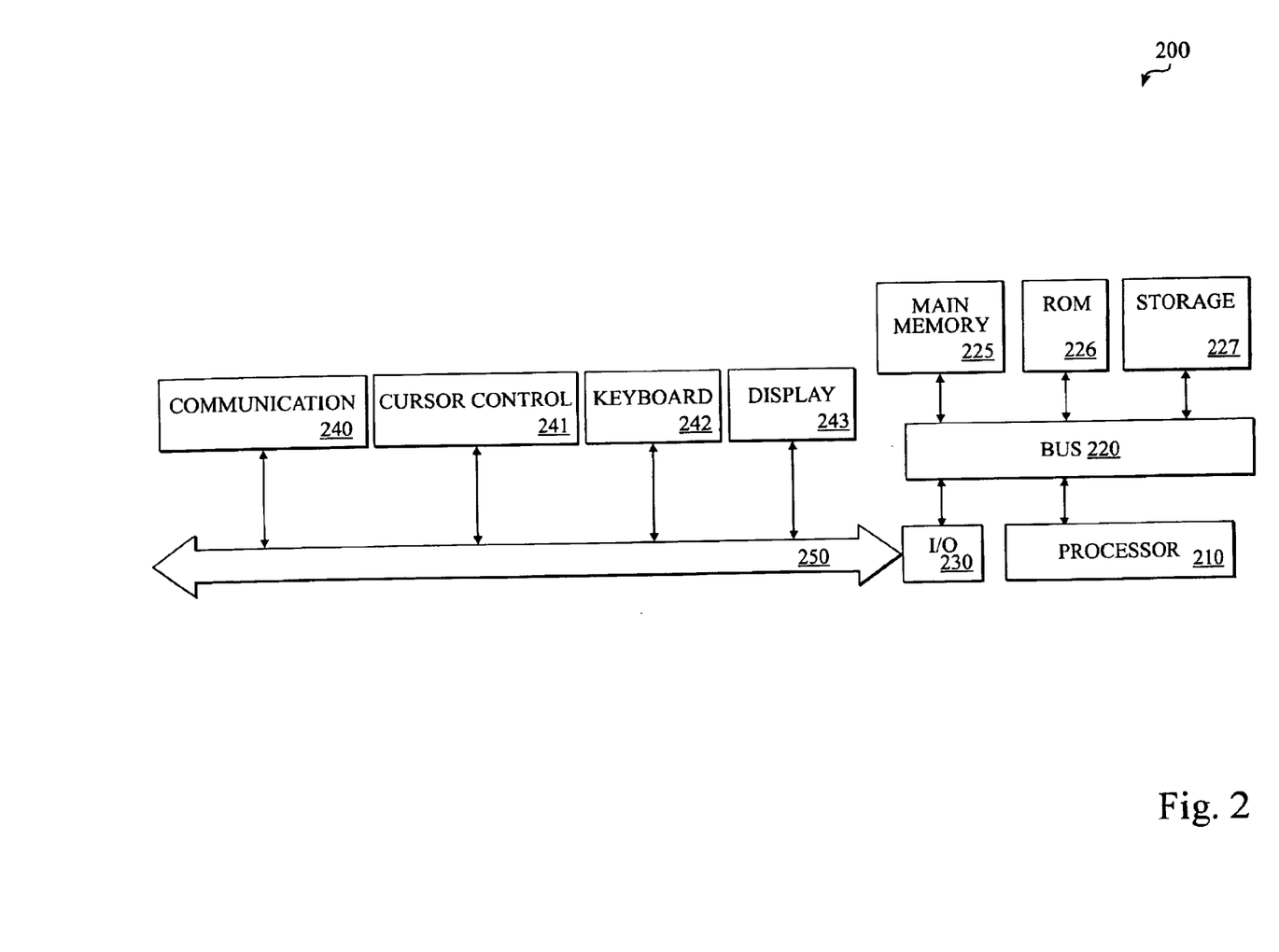
FIG. 2 is an exemplary block diagram of a computer architecture used to implement embodiments of the present invention.

Having briefly described a network architecture, which employs various elements of the present invention, a computer system 200 representing exemplary clients 150, servers 110, and/or voice print adapter 130 in which elements of the present invention may be implemented will now be described with reference to FIG. 2.

One embodiment of computer system 200 comprises a system bus 220 for communicating information, and a processor 210 coupled to bus 220 for processing information. Computer system 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Computer system 200 can also be coupled to a second I/O bus 250 via an I/O interface 230. One or more I/O devices may be coupled to I/O bus 250, including a display device 243, an input device (e.g., an alphanumeric input device 242 and/or a cursor control device 241). For example, video news clips and related information may be presented to the user on the display device 243.

The communication device 240 is for accessing other computers (servers or clients) via a network 199. The communication device 240 may comprise a modem, a network interface card, or other well-known interface device, such as those used for coupling to Ethernet, token ring, or other types of networks.

It should be noted, however, that the described techniques are not limited to use in speaker verification systems, nor are they limited in application to speech signals or to any particular type of signal. In a speaker verification system such as the one shown in FIG. 1, multiple functions and tasks may be performed. System 100 may be used to verify a caller's identity and allow access to the system 100. System 100 may be used for recognizing a caller 151–155, and verifying that a caller 155 is who the caller claims to be. Specific examples include, using voice responses to listen to credit and banking information, or voice activated, systems used by airlines and other transportation agencies, automated operator systems, etc. However, embodiments of the present method and system are contemplated to only use verification.

System 100 may perform these tasks as follows. Caller 151 attempts to access system 100 via a telephone in order to obtain the caller's checking account balance. Caller 151 may be prompted to submit an utterance for identification and verification purposes (also called an identity claim). For example, the caller 151 may be asked to say his or her name. That utterance will be recognized by system 100, and a database of permitted callers will be searched and a speaker model corresponding to the utterance will be extracted to determine if the caller's 151 name is valid. If caller 151's name is valid, the name may then be analyzed by a verifier. The verifier will determine whether caller 151 is really caller 151 or an imposter. The verification process involves analyzing the utterance and comparing it to a speaker model stored in database 140. If the utterance and speaker model are a close match, then the caller 151 is verified. If the caller 151 has been recognized and verified, then caller 151 may access their checking account information.

In addition, system 100 may adapt the speaker model stored in database 140 so that verification will be improved. The adaptation process is discussed at length below. For instance, if callers 151–155 call into system 100, system 100 will adapt the speaker models of callers 151–155 to more accurately reflect the voice patterns of its associated caller; therefore, increasing the accuracy of system 100. The greater frequency of caller's 151–155 use of system 100, the more accurate system 100 becomes.

Figure 3:
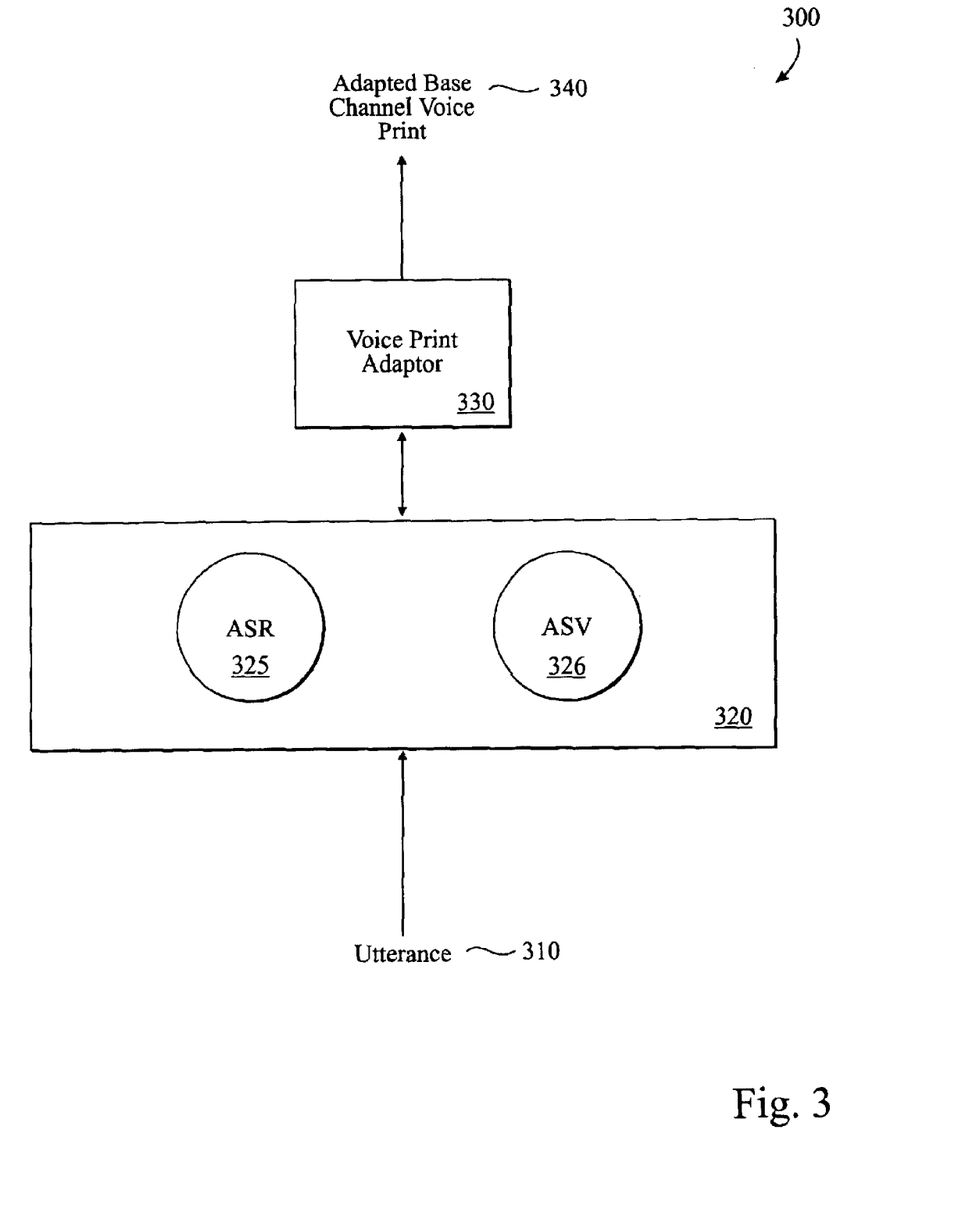
FIG. 3 shows an example of the processing flow of a speaker verification system according to one embodiment of the present invention.

FIG. 3 shows a high-level block diagram of a speaker verification system in which the present method of on-line unsupervised adaptation is implemented. For example, if a caller 151–155 is recognized and verified, the speaker model of that caller 151–155 may be adapted and improved.

It should be noted, however, that the described techniques are not limited in application to speech signals or to any particular type of signal. An utterance 310 from a caller 151–155 is provided to authentication mechanism 320. The utterance claim 310 may be any reproducible identity claim such as a name, password, phone number, zip code, or user identification number. A telephone, transceiver, microphone, or any such sound-capturing device may be used to provide utterance 310 to authentication mechanism 320. The utterance 310 may be received via a network, such as a public switched telephone network (PSTN). In one embodiment, authentication mechanism 320 includes an automatic speech recognizer (ASR) 325 and an automatic speaker verifier (ASV) 326. The authentication mechanism 320 may be any integrated ASR/ASV, such as Nuance 7 manufactured by Nuance Communications of Menlo Park, California. In alternate embodiments, the present techniques may be implemented with ASV 326, only. Furthermore, it is also contemplated that voice print adapter 330 may be integrated within authentication mechanism 320 and more specifically within ASV 326.

The authentication mechanism 320 returns authentication results to voice print adapter 330. Voice print adapter 330 compares the authentication results with a predetermined threshold level of accuracy. If the authentication results meet or exceed the threshold level, then voice print adapter 330 adapts the caller's 151–155 base channel voice print. However, if the authentication results fall lower than the threshold level, then voice print adapter 330 does not alter the caller's 151–155 base channel voice print. The authentication results may be in the form of a confidence score, indicating the system's 100 certainty of a correct verification.

Servers 110 perform various identity verification tasks. Servers 110 include an automatic speech recognizer and an automatic speaker verifier. The servers 110, each can be an IBM® personal computer (PC), an Apple Macintosh® PC or a SUN® SPARC workstation, for example.

Figure 4:
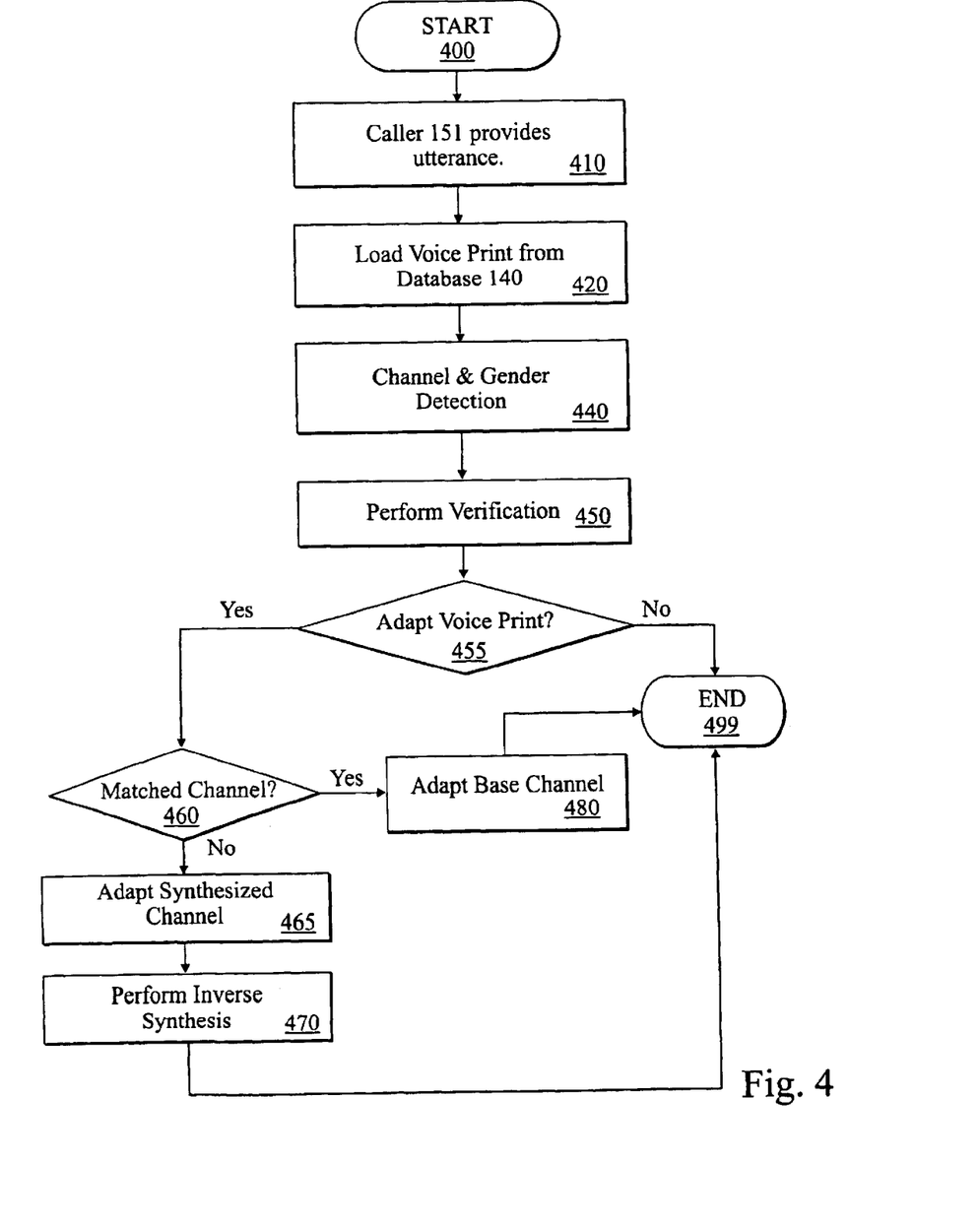
FIG. 4 shows an exemplary flow diagram of the process performed by a voice print adapter.

FIG. 4 shows an exemplary flow diagram of the process performed by voice print adapter 330. When a caller 151–155 first enrolls with system 100, caller 151–155 provides basic information. A voice print may be trained with the utterance provided during enrollment. Furthermore, the type of channel used by caller 151 is recorded. This process is referred to as enrollment of the caller 151–155 on the base channel. The quality of the voice print is determined by how closely it matches caller's 151–155 actual natural voice patterns. If the voice print is a high quality voice print, then system 100 may provide very accurate speaker verification for caller 151–155. Likewise, if the voice print quality is low, then it may be improved by voice print adapter 330, which in turn will provide more accurate speaker verification. It is also contemplated that the quality of a voice print need not be low, in order for the present adaptation techniques to be employed, for example, in cases of voice prints with insufficient data.

Low quality voice prints may occur due to disturbances on the channel used during enrollment, or when there is insufficient data associated with the voice print to render adequate verification. For example, static on an electret phone, or a distorted cellular connection may cause a low quality voice print to be produced and stored in database 140. Channels, other than an electret phone may be used during enrollment including carbon button pay phones, digital and analog cellular telephones, coded speech, pc microphone, portable phone, PDA, voice-over-IP, and hands-free phones. The channel used during enrollment is referred to as the base channel.

After completing enrollment, the process of FIG. 4 begins at block 400. At processing block 410, caller 151 provides an utterance. As described above, the utterance may be obtained via a communication device such as a wired telephone, carbon button pay phones, digital and analog cellular telephones, coded speech, pc microphone, portable phone, PDA, voice-over-IP, and hands-free phones. The utterance is recognized by the authentication mechanism 320, and a voice print is loaded from database 140 to compare with the utterance, at processing block 420. At processing block 440 voice print adapter 330 detects the type of channel used by caller 151. In addition, voice print adapter 330 detects the gender of caller 151. Verification is performed at processing block 450, and the caller is either granted or denied access. Authentication mechanism 320 generates a confidence score that is used by voice print adapter 330 to decide at decision block 455 if the voice print should be adapted. In one embodiment, the authentication mechanism 320, provides voice print adapter 330 with a confidence score that indicates how well the channel dependent synthesized speaker model matches the utterance of caller 151.

If the voice print is not going to be adapted, then the process terminates at block 499. If a decision is made to adapt, the voice print flow continues to decision block 460. At decision block 460, if the channel used by caller 151 is the same as the channel used by caller 151 during enrollment (base channel), then flow passes to processing block 480. For example, if caller 151 uses an office telephone during enrollment, and then calls in at a later time from the same office telephone, the channels match. However, if the channels do not match, then flow passes to processing block 465.

If the channels match, the base channel voice print may be adapted directly from the utterance. At processing block 480, in the case where caller 151 calls again into system 100 from the same channel as the base channel, the original voice print may be adapted to improve its quality if the caller's utterance provides a better quality voice print than the voice print stored in database 140. As described above, the adaptation occurs by gathering statistics from the utterance, and then combining them with the voice characteristics of the base channel voice print. Flow continues from processing block 480, to block 499, where the process terminates.

When the channels do not match, at processing block 465, the synthesized channel is adapted. At processing block 470 inverse synthesis is performed. A forward synthesized speaker model may be generated from the voice print specific to the channel type caller 151 is using. The model may also be gender specific. For example, if caller 151 used an electret phone as the base channel, and subsequently calls into system 100 on a carbon button channel (i.e., from a pay phone), then the utterance will have an acoustic mismatch with the stored voice print. In order to compensate for the mismatch, a synthetic speaker model for carbon button will be created through a forward transformation. The carbon button speaker model is synthesized from the voice print stored in database 140. In one embodiment, the speaker model is created with a handset dependent, gender-dependent, and speaker-independent Gaussian Mixture Model (GMM) using a Bayesian adaptation approach.

Multiple GMMs are estimated for each speaker, with each GMM corresponding to a unique channel. Each GMM is constructed by adapting a common root GMM that ensures a correspondence between each Gaussian in all GMMs. A model for a channel that was not seen during enrollment is synthetically constructed through a model-based transformation, such as set forth in equations (1), (2), and (3).

$$T_{ab}(w_i) = w_i \left( \frac{w_{b,i}}{w_{a,i}} \right), \tag{1}$$

$$T_{ab}(\mu_i) = \mu_i + (\mu_{b,i} - \mu_{a,i}), \tag{2}$$

$$T_{ab}(\sigma_i^2) = \sigma_i^2 \left( \frac{\sigma_{b,i}^2}{\sigma_{a,i}^2} \right), \quad (3)$$

where T is the transformation between channels a and b, and $W_{a,i}$, $\mu_{a,i}$, and and $\sigma_{a,i}$ refer to the mixture weight, mean and variance of the i-th Gaussian of channel a.

The statistics of the utterance are gathered and combined with the statistics of the synthesized model. The modified synthesized model then undergoes an inverse synthesis back to the base channel. The statistics of the voice print are updated to reflect the statistics of the inverse synthesized model. This new inverse synthesized base channel speaker model may be combined with the original voice print stored in database 140, to generate a new higher quality adapted voice print, than originally stored in database 140. Flow continues from block 470 to block 499 where the process ends.

The process of FIG. 4 occurs simultaneously as caller 151 is using system 100. Furthermore, no human involvement is required to determine if the voice print should be adapted, thus the system 100 is unsupervised.

Furthermore, voice print adapter 130 performs confidence-based adaptation. Confidence based adaptation allows aggressive adaptation of the base channel voice print if the verification score generated by authentication mechanism 320 indicates confidence about the identify of the caller 151. In one embodiment, a Raleigh distribution is used to determine how aggressively to adapt. In the case of a Raleigh distribution, a very high confidence may result in no adaptation, since the present synthesized model appears to already be very accurate. Likewise, a very weak confidence may result in no adaptation as well, since adaptation may degrade the quality of the original voice print. If the confidence score, A, returned by authentication mechanism 320 is used to form the adaptation weight W, a nonlinear function of the confidence score based on the cumulative Raleigh distribution may be described as set forth in equation (4).

$$W(\Lambda) = 1 - \exp\left[\frac{-(\Lambda - \tau)^2}{2b^2}\right] \quad (4)$$

where $\tau$ is the acceptance threshold of the authentication mechanism, and b is the Rayleigh coefficient which controls the smoothness of the function.

In addition, voice print adapter 130 utilizes a complexity growing algorithm. The complexity-growing algorithm performs variable rate smoothing. To update the speaker model statistics, as well as provide a method that "tracks" recent changes in the speaker's voice even after many adaptations, the equations (5), (6), and (7) may be used according to one embodiment of the present invention:

$$E_i(x) = E_i(x)^{[0]}(1-F) + W(\Lambda)\beta_\mu E_i(x)^{[1]}, \quad (5)$$

$$E_i(x^2) = E_i(x^2)^{[0]}(1-F) + W(\Lambda)\beta_\sigma E_i(X^2)^{[1]}, \text{ and} \quad (6)$$

$$n_i = n_i^{[0]}(1-F) + W(\Lambda)\beta_\omega n_i^{[1]} \quad (7)$$

where $E_i(x)$ and $E_i(x^2)$ are the expected values of the data x and $x^2$, respectively for the i-th Gaussian in the speaker model, $n_i$ is the probabilistic occupancy of the data in the i-th Gaussian, $E_i(\cdot)^{[j]}$ is the sufficient statistic of the speaker model for the j-th adaptation iteration (e.g., j-th phone call), and W is the adaptation weight described above. The terms ($\beta_\mu$, $\beta_\sigma$, $\beta_\omega$) are Bayesian smoothing factors. Separate smoothing factors are used to enable the system to, for example, rely more heavily on the first-order sufficient statistics until adequate observations have been accumulated to properly estimate the second-order sufficient statistics. Using separate smoothing factors is particularly important for on-line adaptation since it allows the effective complexity of the speaker model to grow with the additional data from new verification attempts, without increasing the actual complexity of the speaker model. The forgetting factor, F, is a number between 0 and 1. Setting F=0 will make the system "remember" statistics from all past utterances completely, and setting F=1 will make the system perfectly track speaker changes but "forget" everything from the past.

As discussed above the GMM is a combination of means, variance and mixture weights. It is desirable to adapt each of the means, variances, and mixture weights at different rates. For example, more information is desirable for adapting a variance, rather than a mean or mixture weight, since the effect of changing a variance incorrectly could damage system 100. Thus, more calls are taken and analyzed by voice print adapter 130 before adapting a variance.

The foregoing has described a system and method for on-line, unsupervised adaptation in speaker verification. It is contemplated that changes and modifications may be made by one of ordinary skill in the art, to the materials and arrangements of elements of the present invention without departing from the scope of the invention.

We claim:

1. A method comprising:
   verifying the identity of a speaker during a speaker verification session based on a speaker model, including generating a confidence score representing a degree of confidence that the speaker is who the speaker claims to be;
   determining whether a communication channel user by the speaker during the speaker verification session matches a base channel that was previously used by the speaker to enroll the speaker for speaker verification;
   if the communication channel matches the base channel, then automatically updating the speaker model for use during subsequent speaker verification, based on vocal characteristics of the speaker on the communication channel; and
   if the communication channel does not match the base channel, then automatically updating the speaker model for use during subsequent speaker verification by transforming the speaker model between channels, based on vocal characteristics of the speaker on the communication channel;
   wherein said automatically updating the speaker model comprises updating the speaker model by a degree of aggressiveness that is based on the confidence score.

2. A method as recited in claim 1, further comprising:
   detecting the vocal characteristics of the speaker on the communication channel during the speaker verification session;
   wherein verifying the identity of a sneaker comprises verifying the identity of the speaker by using the speaker model and the vocal characteristics; and
   wherein automatically updating the speaker model is performed only after the identity of the speaker is verified.

3. A method as recited in claim 1, wherein said automatically updating the speaker model for use during subsequent speaker verification by using transformation between channels comprises:
   transforming the speaker model from the base channel to correspond to the communication channel;

adapting the transformed speaker model based on the vocal characteristics of the speaker on the communication channel, and inverse transforming the adapted transformed speaker model to correspond to the base channel.

4. A method as recited in claim 1, further comprising detecting the gender of the speaker, wherein the speaker model is gender-specific.

5. A method as recited in claim 1, wherein the channel is one of a plurality of channels usable by the speaker for verification, each corresponding to a different type of communication device.

6. A method as recited in claim 1, wherein the size of the speaker model is not increased as a result of the speaker model being updated.

7. A method of performing unsupervised adaptation of a speaker model for use in speaker verification, the method comprising:

detecting a communication channel by which an utterance of a speaker is received for speaker verification;

learning vocal characteristics of the speaker on the detected channel;

verifying the identity of the speaker by using a speaker model associated with the speaker;

determining whether the detected communication channel matches a base channel previously used to enroll the speaker for verification;

if the detected communication channel matches the base channel, then updating the speaker model for subsequent use in speaker verification, based on the learned vocal characteristics of the speaker; and if the detected communication channel does not match the base channel, then updating the speaker model for subsequent use in unsupervised speaker verification, by transforming the speaker model to correspond to the detected channel, adapting the transformed speaker model based on the learned vocal characteristics of the speaker, and inverse transforming the adapted transformed speaker model to correspond to the base channel.

8. A method as recited in claim 7, wherein the first and second speaker verification sessions are unsupervised.

9. A method as recited in claim 7, further comprising learning the characteristics of the utterance on the detected channel prior to said updating the speaker model.

10. A method as recited in claim 7, further comprising verifying the identity of the speaker during the first speaker verification session based on the speaker model, including generating a confidence score representing a degree of confidence that the speaker is who the speaker claims to be;

wherein said updating the speaker model comprises updating the speaker model by a degree of aggressiveness that is based on the confidence score.

11. A method as recited in claim 7, further comprising detecting the gender of the caller, wherein the speaker model is gender-specific.

12. A method as recited in claim 7, wherein the channel is one of a plurality of channels usable by the speaker for verification, each corresponding to a different type of communication device.

13. A method as recited in claim 7, wherein said updating the speaker model comprises:

updating a first speaker model based on vocal characteristics associated with a second speaker model; and discarding the second speaker model.

14. A method as recited in claim 7, wherein the size of the speaker model is not increased as a result of the speaker model being updated.

15. A processing system comprising:

a processor; and a storage facility coupled to the processor and storing instructions which, when executed by the processor, cause the processing system to perform a process including:

verifying the identity of a speaker during a speaker verification session based on a speaker model, including generating a confidence score representing a degree of confidence that the speaker is who the speaker claims to be;

determining whether a communication channel user by the speaker during the speaker verification session matches a base channel that was previously used by the speaker to enroll the speaker for speaker verification;

if the communication channel matches the base channel, then automatically updating the speaker model for use during subsequent speaker verification, based on vocal characteristics of the speaker on the communication channel; and if the communication channel does not match the base channel, then automatically updating the speaker model for use during subsequent speaker verification by using transformation between channels, based on vocal characteristics of the speaker on the communication channel;

wherein said automatically updating the speaker model comprises updating the speaker model by a degree of aggressiveness that is based on the confidence score.

16. A processing system as recited in claim 15, wherein said process further comprises:

detecting the vocal characteristics of the speaker on the communication channel during the speaker verification session;

wherein verifying the identity of a speaker comprises verifying the identity of the speaker by using the speaker model and the vocal characteristics; and wherein automatically updating the speaker model is performed only after the identity of the speaker is verified.

17. A processing system as recited in claim 15, wherein said automatically updating the speaker model for use during subsequent speaker verification by using transformation between channels comprises:

transforming the speaker model from the base channel to correspond to the communication channel;

adapting the transformed speaker model based on the vocal characteristics of the speaker on the communication channel, and inverse transforming the adapted transformed speaker model to correspond to the base channel.

18. A processing system as recited in claim 15, further comprising detecting the gender of the speaker, wherein the speaker model is gender-specific.

19. A processing system as recited in claim 15, wherein the channel is one of a plurality of channels usable by the speaker for verification, each corresponding to a different type of communication device.

20. A processing system as recited in claim 15, wherein the size of the speaker model is not increased as a result of the speaker model being updated.

21. A speaker verification system comprising:

an automatic speech recognizer to recognize speech of a speaker received on a detected channel during a first unsupervised speaker verification session;

an automatic speaker verifier to verify the identity of the speaker during the first unsupervised speaker verification session by using a speaker model associated with the speaker, wherein the speaker model corresponds to a base channel previously used by the speaker to enroll the speaker for speaker verification, and the detected channel is a channel other than the base channel; and an automatic adapter to update the speaker model for use during a subsequent unsupervised speaker verification session, based on vocal characteristics of the speaker on the detected channel, by automatically:

transforming the speaker model from the base channel to correspond to the detected channel;

updating the speaker model based on characteristics of the utterance on the detected channel; and inverse transforming the speaker model to correspond to the detected channel.

22. An apparatus comprising:

means for verifying the identity of a speaker during a speaker verification session based on a speaker model, including generating a confidence score representing a degree of confidence that the speaker is who the speaker claims to be;

means for determining whether a communication channel user by the speaker during the speaker verification session matches a base channel that was previously used by the speaker to enroll the speaker for speaker verification;

means for automatically updating the speaker model for use during subsequent speaker verification by a degree of aggressiveness that is based on the confidence score, based on vocal characteristics of the speaker on the communication channel, if the communication channel matches the base channel; and means for automatically updating the speaker model for use during subsequent speaker verification by a degree of aggressiveness that is based on the confidence score by using transformation between channels, based on vocal characteristics of the speaker on the communication channel, if the communication channel does not match the base channel.

* * * * *